Patented June 10, 1947

2,421,837

UNITED STATES PATENT OFFICE 2,421,837

HYDROXY-CYANOALKYL NAPHTHALENES

Albert F. Hardman, Akron, Ohio, assignor to Wingfoot Corporation, Akron, Ohio, a corporation of Delaware No Drawing. Application October 24, 1945, Serial No. 624,327

6 Claims. (Cl. 260—465)

This invention relates to a group of valuable organic chemicals useful as intermediates in the preparation of hydroxy naphthalene substituted fatty acids which have utility in promoting root growth on plant cuttings. More particularly, the invention relates to a series of nitriles which can be converted to acids, amides and esters by procedures known to and described by the prior art.

It is well known that certain organic acids and their derivatives are useful as stimulants for plant growth, and especially in stimulating root growth on plant cuttings. Generally, these acids are complex and difficult to synthesize. Accordingly, it is the purpose of this invention to provide inexpensive intermediates which are readily derived from cheap and commercially available raw materials. A further purpose is to provide methods of preparing the said intermediates.

The new compounds are the 1-(2-cyanoalkyl) 2-hydroxy naphthalenes and are prepared by the reaction of 2-naphthol, otherwise known as beta naphthol, with acrylonitrile or an alpha-alkyl-substituted acrylonitrile, such as methacrylonitrile and ethacrylonitrile, in the presence of substantial quantities of alkali metal hydroxide. The reaction is preferably conducted in a solution or suspension of the reactants in an inert solvent, such as benzene, toluene, petroleum ether or other hydrocarbon. The reactants are heated to a temperature between 50° C. and 150° C., which may be the reflux temperature of the reaction mixture, in a flask provided with a water cooled condenser. Benzene is preferably used as the inert liquid and the temperature maintained between 75° C. and 85° C. When the reaction is completed the mass is mixed with an equal volume of water and the non-aqueous liquid separated.

It is well known that phenol, and other compounds having hydroxyl groups substituted on aromatic rings, will react with acrylonitrile in the presence of sodium metal catalyst to form mixed ethers in accordance with the following equation:

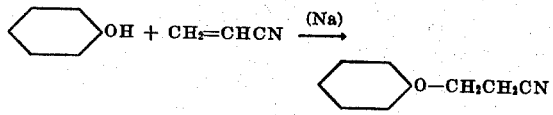

The present reaction is quite unusual in that the hydroxyl radical remains unchanged and the substitution takes place on the alpha carbon atom adjacent to the carbon to which the hydroxyl group is attached. This reaction proceeds as follows:

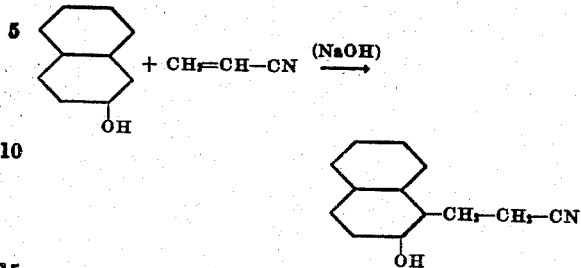

Further details of the preparation and use of the new 1-(2-cyanoalkyl)-2-hydroxy-naphthalenes are set forth in the following example.

Example

A benzene solution (55 cc.) containing 29 grams of 2-naphthol and 12 grams of acrylonitrile was mixed with 9 grams of sodium hydroxide pellets and heated on a steam bath in a reaction vessel provided with a water-cooled reflux condenser. The mixture was refluxed for two hours. 100 cc. of cold water were added and the two-phase liquid was stirred until all of the sodium hydroxide was dissolved. The two liquid phases were then separated and the aqueous solution filtered and treated with acetic acid. 37 grams of 2-hydroxy-1-naphthalenepropionitrile were precipitated. After recrystallization from an ethyl alcohol solution, a white solid having a melting point of 142° C. was secured. It had the following structure:

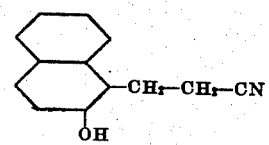

By the employment of an alpha-alkyl substituted acrylonitrile in place of the acrylonitrile in Example 1, other compounds of similar structure can be prepared, for example 1-(2-cyano-n-propyl)-2-hydroxy-naphthalene and 1-(2-cyano-n-butyl)-2-hydroxy-naphthalene. These new nitriles may be converted to acids by refluxing in the presence of sodium hydroxide followed by treatment with a strong mineral acid. The acids so prepared may be converted to lactones by heating at reflux temperature in a toluene solution. The lactone may then be converted to an amide by reaction with gaseous ammonia. Other uses for the new compounds will be readily apparent to a skilled chemist.

This application is a continuation-in-part of application Serial No. 556,490, filed September 29, 1944.

Although the invention has been described with respect to a specific example, it is not intended that the details thereof should be construed as limitations upon the scope of the invention except to the extent incorporated in the following claims.

I claim:
1. A 1-(2-cyanoalkyl)-2-hydroxynaphthalene.
2. 1-(2-cyanoethyl) 2-hydroxy naphthalene.
3. 1-(2-cyano-n-propyl) 2-hydroxy naphthalene.
4. A method of preparing 1-(2-cyanoalkyl)-2-hydroxy naphthalene which comprises heating approximately equal molecular proportions of 2-naphthol and a compound of the group consisting of acrylonitrile and alpha alkyl substituted acrylonitriles in the presence of an alkali metal hydroxide.
5. A method of preparing 1-(2-cyanoethyl) 2-hydroxynaphthalene which comprises heating approximately equal proportions of 2-naphthol and acrylonitrile in the presence of an alkali metal hydroxide.
6. A method of preparing 1 - (2 - cyano-n-propyl) 2-hydroxy-naphthalene which comprises heating 2-naphthol and methacrylonitrile in the presence of an alkali metal hydroxide.

ALBERT F. HARDMAN.

REFERENCES CITED

The following references are of record in the file of this patent:

FOREIGN PATENTS

| Number | Country | Date |
|---|---|---|
| 670,357 | Germany | Jan. 17, 1939 |
| 833,734 | France | Oct. 28, 1938 |